June 4, 1929.   M. N. RIDLEY   1,716,004
WHEEL AND RAIL FOR THE PURPOSE OF ENABLING VEHICLES
TO BE USED ON ROADS OR RAILWAYS
Original Filed Nov. 21, 1923   6 Sheets-Sheet 3
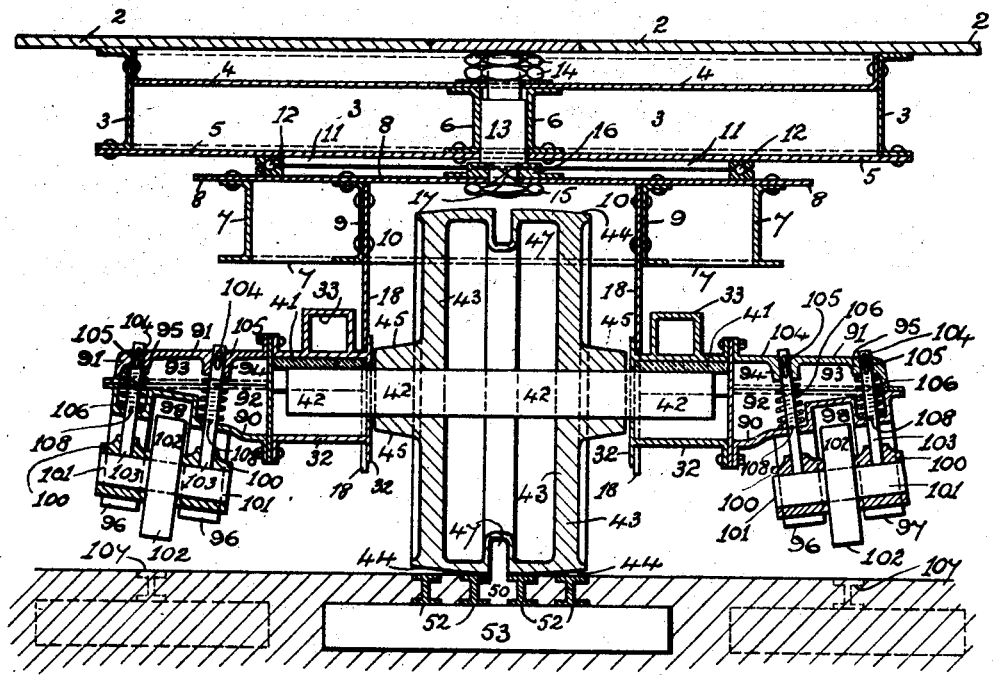
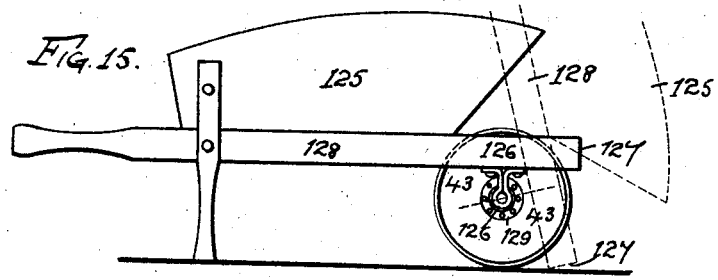

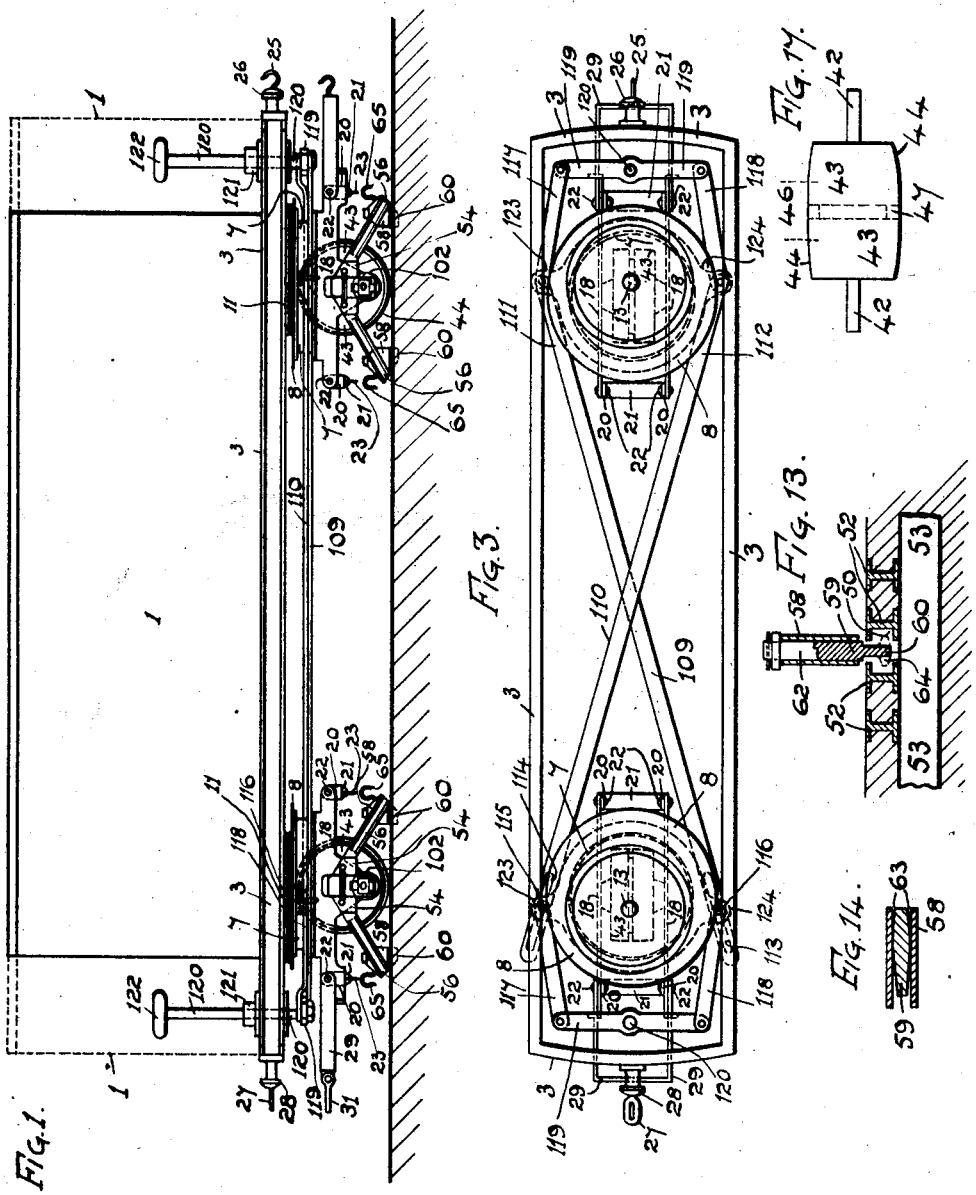

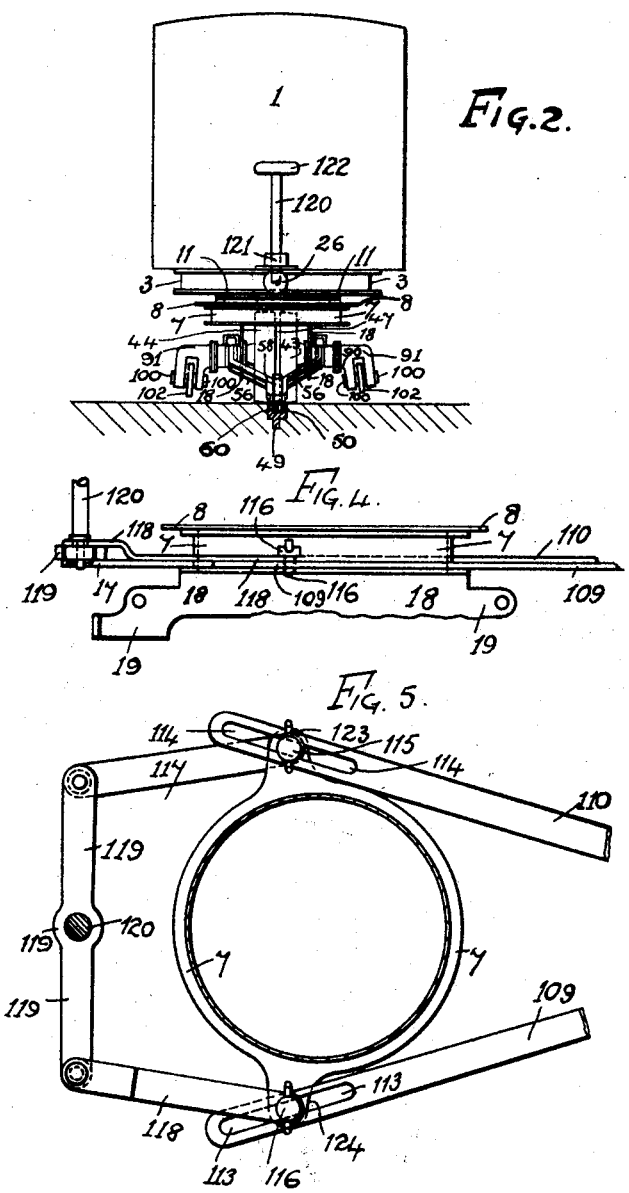

June 4, 1929.　　　　M. N. RIDLEY　　　　1,716,004
WHEEL AND RAIL FOR THE PURPOSE OF ENABLING VEHICLES
TO BE USED ON ROADS OR RAILWAYS
Original Filed Nov. 21, 1923　　6 Sheets-Sheet 4
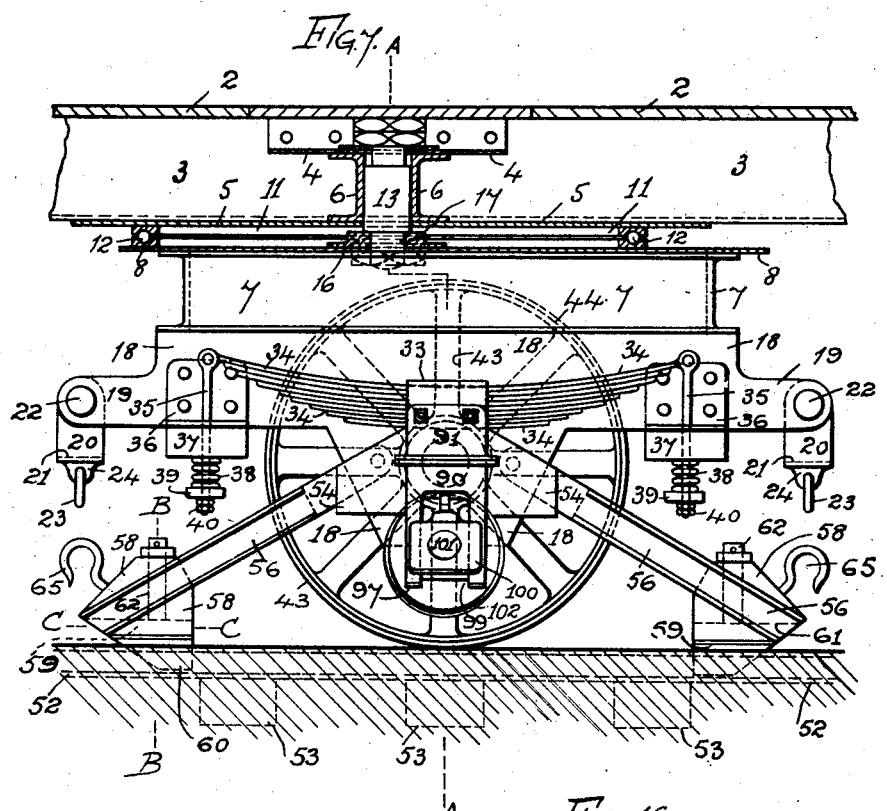
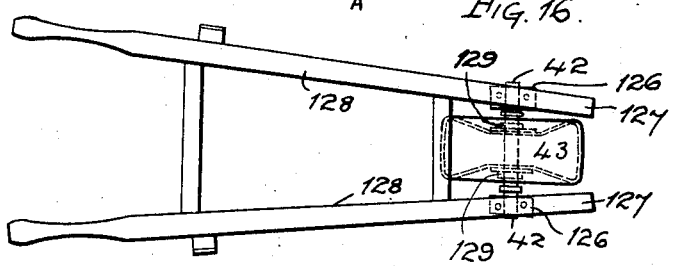

June 4, 1929.                M. N. RIDLEY                1,716,004
    WHEEL AND RAIL FOR THE PURPOSE OF ENABLING VEHICLES
                 TO BE USED ON ROADS OR RAILWAYS
         Original Filed Nov. 21, 1923    6 Sheets-Sheet 5
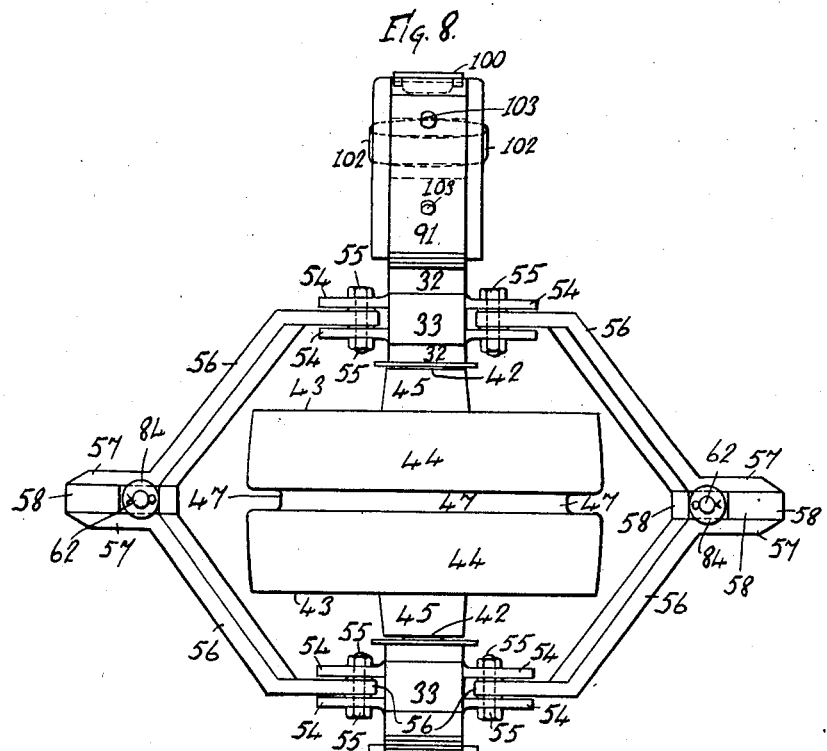
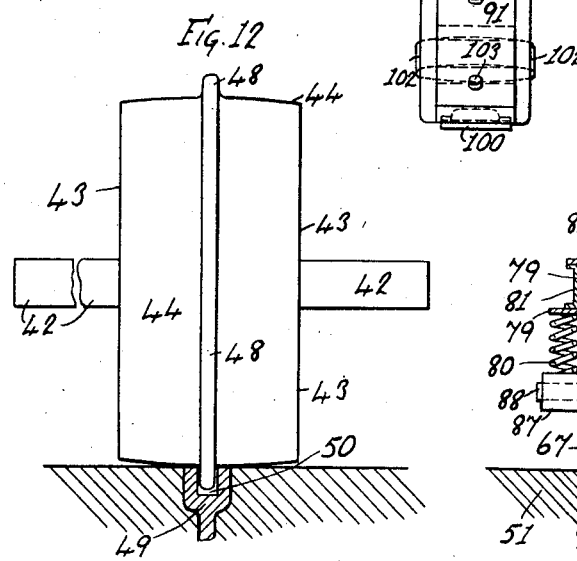
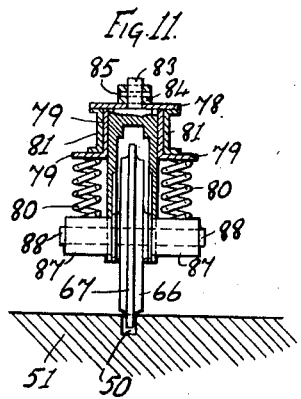

Patented June 4, 1929.

1,716,004

UNITED STATES PATENT OFFICE.

MARTYN NOEL RIDLEY, OF LEEDS, ENGLAND.

WHEEL AND RAIL FOR THE PURPOSE OF ENABLING VEHICLES TO BE USED ON ROADS OR RAILWAYS.

Application filed November 21, 1923, Serial No. 676,049, and in Great Britain November 22, 1922.
Renewed February 19, 1929.

This invention relates to improvements in the wheels of railway or tramway or road vehicles, or wagons, or wheel-barrows, or the like,—all of which are hereinafter termed and included in the term "the vehicle",—and to rails in order that the vehicle may travel or run upon a laid or prepared track, or upon an ordinary macadam or other road without changing the body of the vehicle from one set of wheels and trolley to another, and without any transhipment of the goods, or break of bulk. This invention may also be readily applied to lorries, motor-cars and automobiles, which can then readily be adapted to travel both upon ordinary road or rails at will.

The vehicles to which this invention particularly relates is of the bogie type and it has frequently been applied to locomotives having one or more rail bogies and one or more pairs of driving wheels running on a road track outside the rail track. The bogie or bogies in such cases has or have been pivotally attached to the frame whilst each pair of driving wheels has been mounted on a different axle. The driving wheels are thus entirely determinate as to direction and can without difficulty be maintained substantially parallel with the track by means of the bogies.

In the said type of wheels, the wheels which have been mounted in pairs upon the separate axles are larger in diameter than those employed upon the bogies which run on the rails. In this arrangement the central wheels have been provided with rubber tyres which run upon the ground and may be employed for driving purposes.

The tyres of all the wheels in the above arrangement are of the usual construction.

In some cases the said construction of locomotive has been employed as a tractor.

This invention differentiates from the foregoing in that whilst a larger central wheel is employed it may be used for driving purposes and a specially prepared track is employed therefore the said track also being used for both the guide wheels or blocks and the main driving wheels, and provision is also made for attaching the bearings of the axle of a central wheel to laminated or other springs, and in addition thereto the said bearings are provided with extensions in which are mounted the rods of spring controlled bearings for the axles upon which the safety wheels are mounted. The curved periphery of the central wheel,—hereinafter termed "the stability wheel",—is provided with a flat central portion or with a projection of a circumferential groove, and the stability wheel is preferably,—though not necessarily so,—pivoted out of centre with the pivot of the bogie and framework to which it is attached.

A practical way of carrying the invention into practice both as regards vehicles and wheel-barrows is illustrated in the annexed drawings in which:—

Fig. 1 is an elevation of a vehicle with this invention applied in which guide blocks are used at the front and rear of the stability wheel:—

Fig. 2 an end elevation of Fig. 1:

Fig. 3 a plan of part of the under carriage:

Fig. 4 a part elevation of the turn-table and a portion of the steering gear.

Fig. 5 a plan of Fig. 4:

Fig. 6 is an enlarged sectional elevation on the irregular line A, A, Fig. 7:

Fig. 7 is a part sectional elevation drawn at a right angle to Fig. 6;

Fig. 8 is an enlarged plan of the stability wheel, its axle, safety wheels and frame for carrying the guide blocks shown at Fig. 1:

Fig. 9 a part sectional elevation of the stability wheel and guide wheels having central flanges used in place of the blocks shown at Fig. 1, and with means for raising them clear of the rails or tracks:

Fig. 10 a plan of Fig. 9:

Fig. 11 a part sectional elevation drawn at a right angle to Fig. 9 showing the method of mounting the flanged guide wheels in their bearings.

Fig. 12 an enlarged elevation of a stability wheel with a central flange, its axle and one form of guide rail;

Fig. 13 is a section on line B, B Fig. 7;

Fig. 14 a sectional plan on line C, C Fig. 7;

Fig. 15 is an elevation showing the stability wheel adapted to a wheel-barrow;

Fig. 16 a part plan of Fig. 15;

Fig. 17 an elevation of a stability wheel adapted for use on a barrow.

The several views of the drawings are drawn to different scales, but like parts in all of the views are marked with similar figures of reference.

1 is the body of a vehicle provided with a floor 2 (Figs. 6 and 7). To the floor 2 of the vehicle is attached an iron framework 3 provided with the horizontal cross-pieces 4, 4 and 5, and the central flange portion 6 for purposes to be presently described. The framework 3 is thus made in skeleton form with provision being made for mounting a single central wheel at each end of the vehicle. At each end of the vehicle is attached the turn-table portion of a bogie 7. Each bogie 7 is also in skeleton form and consists of a flanged circular girder to which is riveted or otherwise fixed a plate 8. Each turn-table,—hereinafter termed and included in the term the bogie 7,—is provided with the flanged longitudinal portions 9, 9 by which a recess 10 is formed in the bogie for the upper portion of the stability wheel.

Between the plates 5 and 8 is inserted the antifrictional ball race 11 which is formed in two pieces, as shown at Figs. 6 and 7. Grooves are formed in the said two portions of the race for the reception of the balls 12, or if desired, rollers may be used in place thereof.

The bogie 7 is attached to the frame 3 by the central pivot 13, and is retained in position by the lock nuts 14 and nut 15 engaging respectively with the upper surface of plate 4 and the plate 8, thus strengthened by the plate 16 provided with a square hole in which is inserted a square portion 17 of the lower part of the pivot 13. By the use of the square portion 17 it is insured that the bogie 7 and the pivot 13 will turn together.

It will readily be understood that the weight of the vehicle is borne by the antifrictional bearings.

Attached to the inner surfaces of the vertical flanged pieces 9, 9 are pendant plates 18, 18 which extend a suitable distance downward, and each of the plates 18 is bifurcated at its lower end to receive the bearings for the axle of the stability wheel. The plate 18 is shaped as shown at Fig. 7, and it is provided with an extension 19 at each end thereof to which the arms 20 of the U-shaped pendant pieces 21 are pivoted at 22. A link 23 is also attached to each lug 24 for purposes to be hereinafter described.

When it is required to couple two or more vehicles together on the rails or tracks, then any suitable form of coupling may be employed, such as, hooks and links. That is to say, a hook 25 is mounted in the central buffer 26 carried on the framework, and at the opposite end of the vehicle a link 27 is mounted in the central buffer 28. When the link of one vehicle is in contact with the hook of a second vehicle, then two or more vehicles can be drawn together when similarly connected, but when it is desired to connect two or more of such vehicles together on a macadamized or other highway or road, then it is preferred to use the U-shaped frame 29, the arms of which are pivoted at 22 to the portion 18 of each bogie. Each U-shaped frame 29 is provided with a hook 30 or with a link 31.

In each bifurcated portion 18 is mounted a flanged axle box 32 provided on its upper surface with a box like portion 33 for the reception of say the laminated spring 34. The outer ends of the said spring are attached to the vertical bolts 35, 35 carried by L-shaped brackets 36, 36 fixed to the portions 18, 18 of the bogie. Bolts 35 are made of such a length that they will pass through a block 37 formed of any suitable material, such as wood, or metal, and on the lower end of each of the bolts is mounted a coiled spring 38, a metal plate 39 and lock nuts 40. The bolts 35 are employed for adjusting the tension of the laminated springs 34.

Within the axle box 32 is mounted a half bush 41 which forms the bearing for the ends of the axle 42 upon which the central or stability wheel 43 is fixed. The stability wheel 43 may be either made solid or hollow or provided with spokes, as shown at Fig. 7 and they may be made of metal or wood and provided with a rim 44, and when required, but not necessarily, so may also have one or more rubber or other tyres fixed upon the said rim, the width of each tyre varying in accordance with the breadth of the periphery of the wheel. The width of the tread of each wheel is made not less than one-half of the radius of the wheel. Each wheel is provided with the bosses 45 which may fill up the space between the pendant portions 18, 18. The periphery or rim of each stability wheel is of roller or barrel form and of such a width as is required for stability, but the periphery of the wheel is not straight as for a roller or curved to the shape of an ordinary barrel. The curve of the tread of the wheels constructed according to this invention is of a much larger radius than ordinary barrels so that the centre of the radius of the circle of the tread is always above the centre of gravity of the vehicle for enabling the latter to be in a vertical position whether in motion or at rest. If no cant or curve is given to the road and the vehicle in motion is running round a curve, it will sway to the extent or a little more as effected by the centrifugal force due to the curve and the speed of the vehicle. This stability is always assured so that the vehicle has the same safety as with a pair of wheels. The curve of the peripheries of the wheels need not be of one radius, as for example, the central portion 46 between the vertical lines (Fig. 17) may be flat,—with or without a circumferential recess or groove 47 formed therein,—and the curves of the periphery of the rims 44 of variable radii.

The periphery or rim 44 may either have a circumferential groove 47 formed therein, as at Fig. 6, or provided with a central projection or flange as at 48 Fig. 12 according to whether the rail or track is provided with a recess or with a projection.

The stability wheel 43 may be of any suitable diameter and breadth which corresponds with the width of the vehicle to which the bogie and wheels are to be applied and in some cases instead of fixing the pendant portions 18, 18 to the insides of the flanged parts 9, 9 they may be attached to the inner surfaces of the bogie 7, and if required the said bogie may also be made of larger dimensions than shown at Figs. 6 and 7 so that a wider wheel may be used.

The track upon which the herein described stability wheel may work may either be formed in a similar manner to that of an ordinary tramway rail, as shown at 49 (Fig. 12), or the groove 50 instead of being made in the metal rail 49 may be formed in the concrete or other material 51 of which the road or track is formed, as shown at Fig. 11. Or, if so desired, the track may be formed of a number of parallel lines of H-iron so arranged that a slot is formed between two of such parallel lines. At Figs. 6 and 13 are shown four parallel lines 52 of H-iron with a slot 50 formed between the two central portions. The H-iron lines are mounted upon sleepers or girders 53 with their tops level with the surface of the track. The track for the rail may be formed in any convenient manner, such as, for example say, as on railways. The H-iron rails may be laid between the ordinary rails of existing road or tramway tracks, and the ordinary rails may either be removed or be used for the safety wheels to be hereinafter described.

It will readily be understood that if a circumferential groove is formed in the stability wheel, then the slot 50 will be dispensed with and a raised rail employed in place thereof which enters the said groove. When the stability wheel 43 with a central flange 48 is employed then the vehicle cannot leave the rails and run on an ordinary macadamized or other road.

At Fig. 7 the stability wheel 43 is shown out of centre for throwing the weight of the vehicle towards the centre of the arc or curve around which the vehicle is travelling, but if desired the stability wheel may be pivoted centrally or in alignment with the pivot 13.

On each axle box are provided two pairs of lugs 54, 54 to which are joined by bolts 55 the ends of the frame 56, 56 (Fig. 8). The frame 56 is made in four portions of bars shaped as shown at Fig. 8 and the ends 57 are turned outwards parallel with the central flange or groove, that is, at or about a right angle to the axis. Between each of the ends 57 a space is left for the reception of a block 58 which is shaped as shown at Fig. 7. The frame 56 may be made of trough iron and the block 58 may be secured in position to the ends 57 by bolts, not shown in the drawings. The lower end of the block 58 is bifurcated for receiving the enlarged portion 59 of the tongue 50 (Figs. 7 and 13). The bifurcation in the block 58 extends to the line 61, and above the said line is formed a vertical hole for the reception of the spindle 62 which is of the same diameter as the width of the bifurcation in the block 58.

The enlarged portion 59 is provided with curved sides 63 so as to permit of the tongue slightly oscillating when passing round a curve. A spindle 62 permits of such oscillating movement taking place. Also by this means provision is made for when the vehicle is being placed on the track the tongue 60 will more readily enter the groove 50. It will readily be understood that a pair of frames 56 are provided in front and at the rear of each stability wheel 43, and when blocks 58 and tongues 60 are employed they may be arranged to be raised by hand preparatory to the vehicle running on to a macadamized or other road. When the tongue is employed in some cases, but not necessarily so, a bulb or other suitably shaped lower end 64 is provided which prevents the guides from leaving the slot 50. The said lower end 64 is made of such a size that it can be readily removed from the slot as and when required, but when a bulb is used then special openings will require to be provided in the rail or track for removal purposes. The advantage of the bulb or other shaped end 64 is to prevent the guide coming out of the slot when there is a liability of the vehicle over-turning or tilting more in one direction than is considered safe or convenient. The bulb or other shaped end 64 is employed so as to make derailment practically impossible. In some cases, but not shown in the drawings, a spring may be placed in the bulb so that no shock will occur when the bulb comes in contact with the slot 50. In the case where an ordinary rail is employed any suitable spring clip safety device may alternately be used on both sides of the rail to form the guides. To enable the frames 56 when raised by hand to be retained in that position a hook 65 is fixed to each block 58 for engagement with a link 23. When desired the frames and their blocks may be arranged to be raised by mechanism to be presently described. When the frames 56 and tongues and blocks as described are in their working position and the tongue in the slot 50, then the framework is in the position shown at Fig. 7 where the center of wheel 43 is not directly below or above 13, and the stability wheel 43 with or without a circumferential groove may be employed for enabling the vehicle to be used either on the road or a rail.

In order to reduce the friction as much as possible it may be found advisable to dispense with the use of the blocks and tongues, and to employ in place thereof wheels 66 smaller in diameter than the stability wheel 43, said smaller wheels being provided with a central flange 67, and when such wheels are employed then the framework 56 will require to be modified, as shown at Figs. 9 and 10. That is to say, the framework 68,—which takes the place of the framework 56,—is jointed respectively at its inner ends to the lugs 54 and secured in position by bolts 55 which form the pivots upon which the framework 68 oscillates. The framework in this instance is made in the form of a bell-crank lever, the shorter arm 69 thereof being bifurcated to receive a swivelling nut 70 in which is mounted a screw shaft 71 provided with a right and a left hand screw thread formed therein respectively at suitable distances from its ends. The two screw shafts are arranged horizontally, as shown at Figs. 9 and 10, and one one of the ends thereof is mounted a hand wheel 72, and at the opposite end a bevel or mitre wheel 73 which is arranged to gear with a bevel or mitre wheel 74 fixed upon the transverse shaft 75 which is carried in suitable bearings 76, 76. The cross shaft 75 is provided with a hand wheel 77 at each end thereof so as to enable the screw shaft to be operated from either side of the vehicle.

In order to enable the frames carrying the wheels 66 at the front and rear of the stability wheels being operated at the same time duplicate sets of the screw shaft and swivelling nuts are provided.

The bell-crank levers which are pivoted at 55 to the lugs 54 are made of channel iron and their horizontal portions as shown at Fig. 9,—are secured together by a transverse plate 78. To the inside of each channel iron is fixed an L-shaped plate 79 which is of the same length as the uniting plate 78, which forms brackets against which the upper ends of the coiled springs 80 impinge. Within the L-shaped pieces 79 is a suitably forked portion 81, as shown at Figs. 10 and 11, and provided with curved sides 82,—which extend in a longitudinal direction,—and having a short vertical spindle 83 formed thereon and held in position by means of a collar 84 and pin 85 after it has passed the uniting plate 78. Each arm of the forked bearings is bifurcated at 86 (Fig. 9) to receive the sliding bearings 87 which carries the spindle 88 upon which each wheel 66 is mounted or fixed. The lower end of the coiled springs 80 are arranged to impinge against the upper surfaces of the sliding bearings 87.

When it is required to raise the rear and front wheels 66, 66 simultaneously by turning either the transverse shaft 75 or one of the screw shafts 71 the said right and left hand screw threads of the said shafts act simultaneously upon the shorter arms 69 and the swivelling nuts 70 carried therein and raise the wheels clear of the grooves 50; this is accomplished by gearing the screw shafts 71 to the transverse shafts 75 or vice versa. Stops 54ª 54ª are fixed to the lugs 54, 54 for limiting the upward movement of levers 68. The bearings 76,—which are made in two portions suitably secured together,—are arranged to be supported by the ends of the screw shafts 71 at the ends on which the bevel or mitre wheels 73 are fixed.

In some cases it may be found advisable to reverse the position of the smaller arms of the bell-cranked levers 68 and the screw shafts 71, that is to say the bell-crank levers 68 may be pivoted as shown at Fig. 9, and the smaller arms of said levers, screw shafts 71 and swivelling nuts 70 will then be above the axle 42 instead of below it, as shown in the drawings.

It will be readily understood that when ordinary vehicles have springs it is impossible to have any arrangement connected to the frame of the bogie for the purpose of lifting or lowering the guide wheels, because the truck or its framework moves as much as three inches upwards or downwards. This movement would cause the guide wheels to rise and fall as much as three inches so as to be in harmony with the frame of the vehicle. The height of the axle above the rail or track never varies, therefore the difficulty arises in being able to fix the guide wheels without any variation as to the level. In the present arrangement, particularly as shown at Figs. 9 and 10, it should be noted that the guide wheels are not adapted to the framework of the bogie, but only to the axle of the vehicle by special carrying means for enabling the raising and lowering of the said guide wheels and for retaining them in any desired position irrespective of the movement of the vehicle or of the bogie. In the case of vehicles without springs the method of raising and lowering the guide wheels can be by levers attached to the framework.

To the outer end of each axle box 32 is fixed a suitable carrier made in two portions 90 and 91. The carrier is constructed as shown in section at Fig. 6 and is provided with two recesses 92, 93, in which are formed the bosses 94, 95. To each lower portion 90 of the carrier are formed two pendant pieces 96, 97, arranged with a space 98 between them as shown at Fig. 6. Each pendant piece is bifurcated, as shown at 99 (Fig. 7) for the reception of a sliding bearing 100 in which is mounted the axle 101 upon which the safety wheel 102 is fixed. To the upper portion of each sliding bearing 100 is fixed a spindle 103 provided with a slot 104 through which a pin 105,—which also passes respectively through the boss 94 or 95,—passes for limiting the movement of the said spindle and sliding bearing. A coiled spring 106 is mounted upon each spindle; the ends of the spring impinge respectively against the said bosses and interior portion of the lower portion 90 of the carrier. As soon as the periphery of the safety wheel 102 impinges upon the road or track 107, then the lower ends of the springs will be in contact with the pins 108, which are fixed transversely in the spindle 103 and the outer ends of such pins are arranged to work in suitable recesses formed in the lower portion 90 of the carrier.

In some cases where a tramway is already in existence, then the rails thereof may be allowed to remain, and the H-irons 52 with the slot 50 between them may be laid between the old rails or track 107; the latter may be used as a track upon which the safety wheels 102 may run. The use of a track 107 for the safety wheels is optional.

The herein described H-irons 52 may be laid between the rails of ordinary railways, when this is done, the upper layers of concrete shown at Figs. 6 and 7 are then removed to the level of the sleepers 53, and the H-irons 52 fixed upon the same sleepers as those to which the ordinary rails are fixed. The ordinary rails may then be utilized as tracks for the safety wheels 102.

The bogies 7 for each vehicle may be connected together by bars 109 and 110 (Figs. 1, 3, 4 and 5) which bars are pivoted at one end 111 and 112 to one of the bogies and the opposite ends of each bar are provided with a slot 113, 114 respectively.

A gripping screw 115 and 116 is made to pass respectively through the said slots and also through a hole in the end of each of the links 117 and 118 of the steering mechanism. The said links are connected respectively to the ends of a double ended lever 119 fixed to the steering pillar 120 which is carried in the bearings 121 and provided with a hand wheel 122. The gripping screw is then arranged to be screwed into one of the lugs 123, 124 provided on opposite sides of the circular portion of the bogie 7. The two bars 109, 110 are employed for each pair of bogies and they are arranged to cross each other in a diagonal direction, as shown at Fig. 3 so that when one of such bogies is operated upon, motion is at once transmitted by the said bars to the other bogie; when the vehicle is running on a macadamized or other road the bars 109 and 110 are locked in position by means of the gripping screws 115, 116 which are screwed down tightly by hand, or any other convenient mechanism. By this means both of the stability wheels 43 and their bogies are completely under the control of the driver of the vehicle.

If the vehicle is travelling on rails or tracks such as herein described it is necessary that the wheels should be able to move in any required direction to suit the varying curves of the rails. This is accomplished by unscrewing the said gripping screws thus releasing the slotted diagonal bars which connect the two bogies together.

When the vehicle is travelling upon raised rails the guide wheels at the front and rear of the stability wheel may have grooves formed in their peripheries instead of the central flanges, and the said wheels can be raised when the vehicle is required to run on a macadamized or other road as previously described. Also in some cases the wheels 66 may take the place of the safety wheels 102 and can be used on each of the said tracks 107.

When required there may also be combined with the stability wheels 43 an electric motor of any ordinary and suitable construction for driving the same, and the said motor may be arranged either inside of the wheel or fixed upon the bogie and geared to the axle or to spur of other gearing arranged in the groove 47 in any convenient manner.

Further, when the vehicle is used upon the before named roads only the rear bogie may be made a fixture and the diagonal bars 109, 110 may be dispensed with, the steering mechanism only operating upon the front bogie and parts connected therewith.

The herein described stability wheels 43 may be made smaller in diameter and in breadth for use with wheel-barrows 125, and when used for such it is carried in suitable bearings 126 arranged to be fixed at a suitable distance from the end 127 of the handled frame 128 in order that the front ends of the said framework may form a stop for enabling the contents of the barrow to be emptied when the barrow is tipped into the position shown by dotted lines at Fig. 15.

In some cases the stability wheel 43 may be made in any convenient manner and shaped as shown at Fig. 16 and plates or bosses 129 may be fixed to the sides of the said wheel by any convenient means, such as by rivets or studs. The said wheel is mounted upon an axle 42 carried by the bearings 126, or the said wheel may be shaped as previously described for Fig. 17.

In some cases it may be preferred to use a central buffer in place of two buffers arranged at the end of the framework as is ordinarily done.

What I claim is:—

1. The combination with a vehicle, of a supporting frame, traction means mounted in said frame, said traction means having a flat peripheral portion and the periphery being curved transversely therefrom with a radius greater than the height of center of gravity of the vehicle, and guiding and sustaining means cooperating with said traction means under varying conditions of road travel.

2. The combination with a vehicle, of a supporting frame, traction wheels mounted in said frame, said traction wheels having a central peripheral flattened portion and being transversely curved therefrom with a radius greater than the height of center of gravity of the vehicle, the tread of said wheels being of a width not less than one-half of the radius of said wheels, and guiding and sustaining means cooperating with said traction wheels under varying conditions of road travel.

3. The combination with a vehicle, of a supporting frame, traction wheels mounted in said frame, said traction wheels having its periphery provided with a central flattened portion with the periphery curved therefrom upon a radius of greater length than the height of center of gravity of the vehicle, and guiding and sustaining means cooperating with said traction means and arranged upon opposite sides thereof.

4. The combination with a vehicle, of a supporting frame, traction wheels mounted in said frame, said traction means having its periphery provided with a central flattened portion with the periphery curved therefrom upon a radius of greater length than the height of center of gravity, the periphery being of a width not less than one-half of the radius of said wheels, and guiding and sustaining means cooperating with said traction means and arranged upon opposite sides thereof.

5. The combination with a vehicle, of a supporting frame, traction wheels mounted in said frame, said traction wheels having its periphery provided with a central flattened portion with the periphery curved therefrom upon a radius of greater length than the height of center of gravity of the vehicle, and guiding and sustaining means cooperating with said traction means and arranged upon opposite sides thereof, said means being movably supported with relation to said traction means.

6. The combination with a vehicle, of a supporting frame therefor, traction means mounted in said frame, guiding means arranged upon opposite sides and in alignment with said traction means, and sustaining means mounted axially of said traction means.

7. The combination with a vehicle, of a supporting frame therefor, and traction means mounted in said frame, guiding means adjustably mounted on said frame and arranged upon opposite sides of and in alignment with said traction means, and sustaining means mounted axially of said traction means, said guiding and sustaining means being movably mounted with respect to said traction means.

8. The combination with a vehicle, of a supporting frame therefor, and traction means mounted in said frame, guiding means arranged upon opposite sides and in alignment with said traction means, and sustaining means mounted axially of said traction means, the guiding means being mounted in a frame pivotally attached on said supporting frame and at right angles to said sustaining means.

9. The combination with a vehicle, of a supporting frame therefor, traction wheels mounted in said frame and having a tread configuration to normally maintain the vehicle in upright position, guiding means cooperating with said traction means and adjustably mounted in relation thereto, and sustaining means cooperating with said traction means and angularly disposed with respect to said guiding means, said sustaining means being normally out of contact with a road surface over which the vehicle is traveling.

10. The combination with a vehicle, of a supporting frame therefor and traction wheels mounted in said frame, guiding means pivotally mounted on said frame and arranged upon opposite sides of said traction wheels, said guiding means comprising a frame adjustably mounted with respect to said traction means, and sustaining means cooperating with said traction means to maintain the vehicle in upright position under abnormal conditions of road travel.

11. The combination with a vehicle, of a supporting frame therefor, traction wheels mounted in said frame, said wheels having a flat peripheral portion with the periphery curved therefrom at a radius greater than the height of center of gravity of the vehicle, said traction means being mounted in alignment and normally supporting the vehicle, steering means operable from a single station, and guiding and sustaining means cooperating with said traction wheels under varying conditions of road travel.

MARTYN NOEL RIDLEY.